No. 668,775.  
J. HERFERT.  
COMBINED FLOWER HOLDER AND INSECT TRAP.  
(Application filed July 17, 1900.)  
(No Model.)  
Patented Feb. 26, 1901.
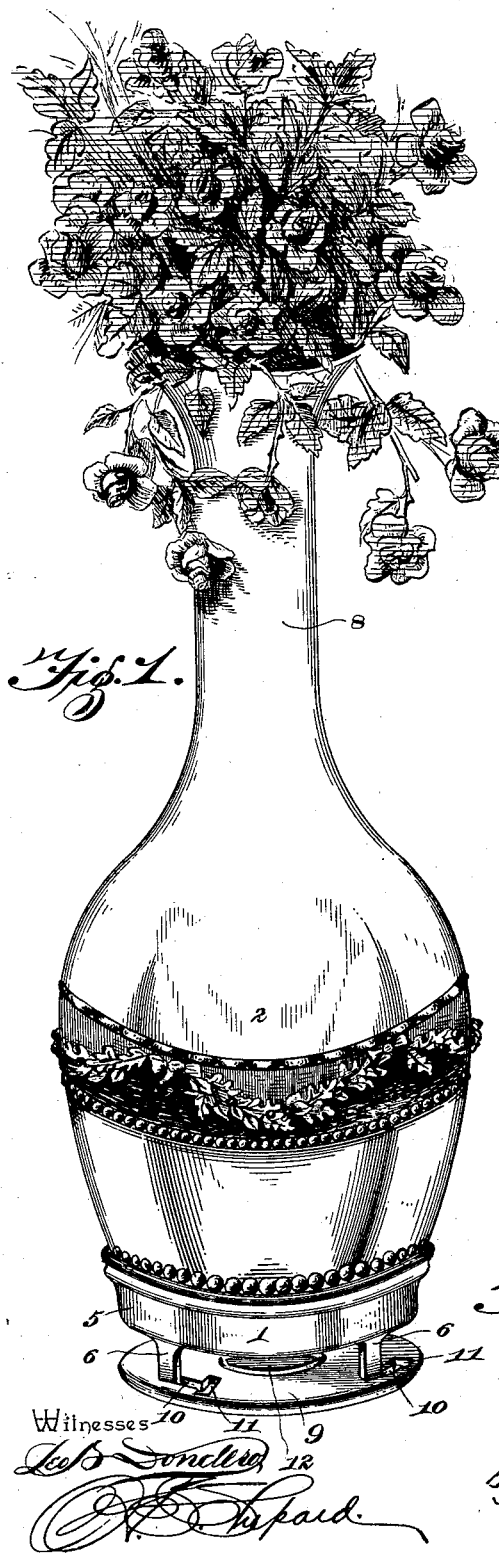
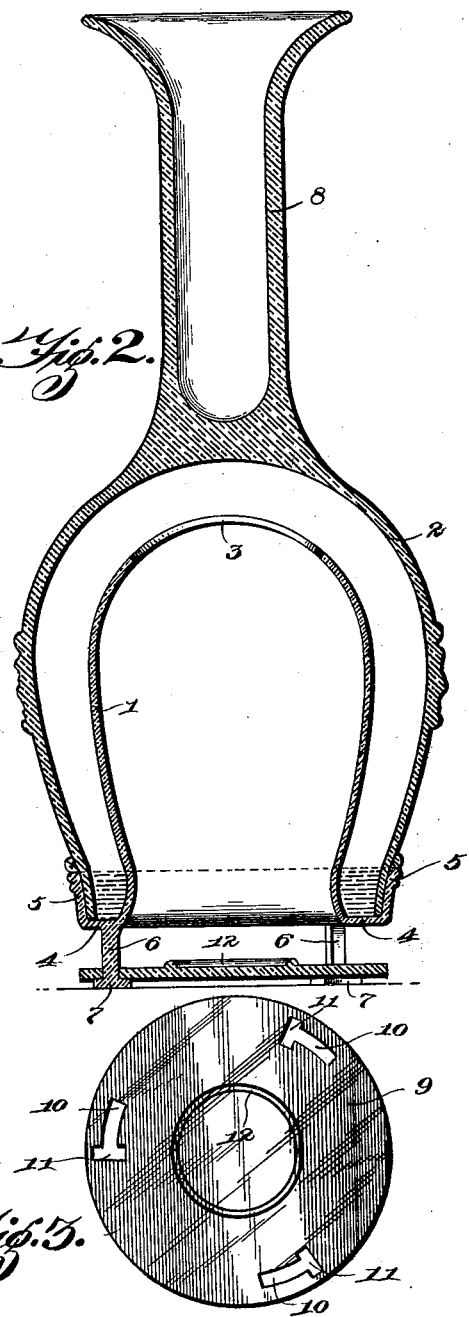

UNITED STATES PATENT OFFICE.

JOSEPH HERFERT, OF TUCKER, WASHINGTON.

COMBINED FLOWER-HOLDER AND INSECT-TRAP.

SPECIFICATION forming part of Letters Patent No. 668,775, dated February 26, 1901.

Application filed July 17, 1900. Serial No. 23,951. (No model.)

*To all whom it may concern:*

Be it known that I, JOSEPH HERFERT, a citizen of the United States, residing at Tucker, in the county of Cowlitz and State of Washington, have invented a new and useful Combined Flower-Holder and Insect-Trap, of which the following is a specification.

This invention relates to insect-traps, and has for its object to provide an improved device of this character, which is especially designed for catching flies.

Ordinarily fly-traps are unsightly and objectionable objects to have upon a dinner-table, as they expose the dead and dying flies to the sight of those seated at the table. In view of this objectionable feature the present invention has been furthermore designed to provide a trap which, while arranged for effectively enticing and trapping the flies, is also constructed to form a flower-holder and to present a neat and attractive appearance, and at the same time to conceal the flies after they have entered the device. It is also designed to arrange the device for conveniently cleansing and removing the dead flies therefrom and to provide means for holding suitable bait to entice the flies into the trap.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of an insect-trap constructed in accordance with the present invention. Fig. 2 is a central longitudinal sectional view thereof. Fig. 3 is a top plan view of the removable bait-holder.

Corresponding parts are designated by like characters of reference in all of the figures of the drawings.

Referring to the accompanying drawings, it will be seen that the trap comprises an inner and outer shell 1 and 2, respectively, each of which is of substantially globular shape and preferably formed of transparent glass. The upper end of the inner shell is rounded over and closed, with the exception of a central opening 3, formed therein, while the lower end of the shell is entirely open for the entire width thereof and provided with a horizontal outwardly-directed annular flange 4, which has an upstanding marginal rim 5, so as to form a gutter about the outer side of the inner shell and at the bottom thereof for containing water or other liquid. Pendent from the bottom of the flange 4 is a plurality of legs 6, the lower ends of which are provided with transverse feet 7, upon which the trap is supported. The outer shell or vessel is of substantially the same shape as the inner shell or vessel, having its upper rounded end entirely closed and provided with an upstanding tubular neck 8 to form a flower-holder. The lower end of the outer shell is entirely open for its full diameter, so that it may be placed downwardly upon the inner shell and have its lower end received within the gutter and supported upon the bottom thereof and snugly against the inner side of the marginal rim 5, so that the outer shell is supported upon the inner shell. By this arrangement there is an annular space provided between the two shells, and the inner shell forms a re-entrant bottom for the entire trap and has an upper opening 3, communicating with the annular space or interior of the trap, whereby the flies are designed to pass beneath the elevated lower edge of the bottom or inner shell, thence upwardly and through the opening 3 into the space between the two shells, and finally into the liquid contained within the gutter, whereby the flies are drowned. The upper portions of the two shells should be transparent, so as to admit light into the interior of the trap, as otherwise the flies will not enter the device. In order that the dead flies may be concealed, the lower portion of the outer shell may be made opaque.

To entice the flies into the trap, any suitable bait may be used, and to support the bait there is provided a bait-holder in the form of a plate 9, of glass or other material, having a plurality of slots 10, provided at corresponding ends with transverse branch slots 11, that extend at opposite sides of the main slot. To connect the bait-holder to the trap, the feet 7 are received through the corresponding transverse slots 11 of the plate 9, after which the latter is given a twist, so as to receive the legs 6 in the longitudinal slots 10, with the feet extending at opposite sides thereof and upon the under side of the plate, whereby the latter is connected to the trap and may be conveniently removed therefrom. By this arrangement a bayonet-slot connection is had between the bait-holder and the trap, the slots being arranged in a marginal series around the plate. Located centrally of the upper side of the plate is an upstanding concentric rib or flange 12 to prevent displacement of bait, such as sugar, molasses, or other suitable material which will attract the flies.

From the foregoing description it will be seen that the outer shell may be conveniently applied and removed from the inner shell, so as to facilitate the placing of a liquid in the gutter and to permit of the convenient cleansing of said gutter, the tubular neck portion or flower-holder 8 forming a convenient handle for manipulating the outer shell; also, the bait-holder is removably connected to the device, so as to facilitate the placing of the bait thereon and the cleansing thereof.

What is claimed is—

1. An insect-trap, comprising a body, having a reëntrant bottom to form an inner annular chamber, and provided with an opening communicating with the chamber, inverted substantially T-shaped legs for the body, and a bait-holding plate, having substantially T-shaped slots to receive the respective legs and connect the plate thereto.

2. An insect-trap, comprising an inner shell, which is open at its upper and lower ends, an outwardly-directed marginal gutter at the lower end of the shell, inverted substantially T-shaped legs to support the shell, a bait-holding plate having substantially T-shaped slots for the reception of the respective legs, and an outer shell having an open lower end to receive the inner shell, the bottom edge thereof resting within the gutter, the upper end of the outer shell being closed and provided with an upstanding tubular neck, forming a flower-holder and a handle to manipulate the shell.

In testimony that I claim the foregoing as my own I have hereto affixed my signature in the presence of two witnesses.

JOSEPH HERFERT.

Witnesses:
S. J. ELY,
J. H. DAVIS.